Sept. 4, 1928.
C. E. SUMMERS
1,682,992
VENTILATING DEVICE FOR ENGINE CRANK CASES
Filed June 25, 1926
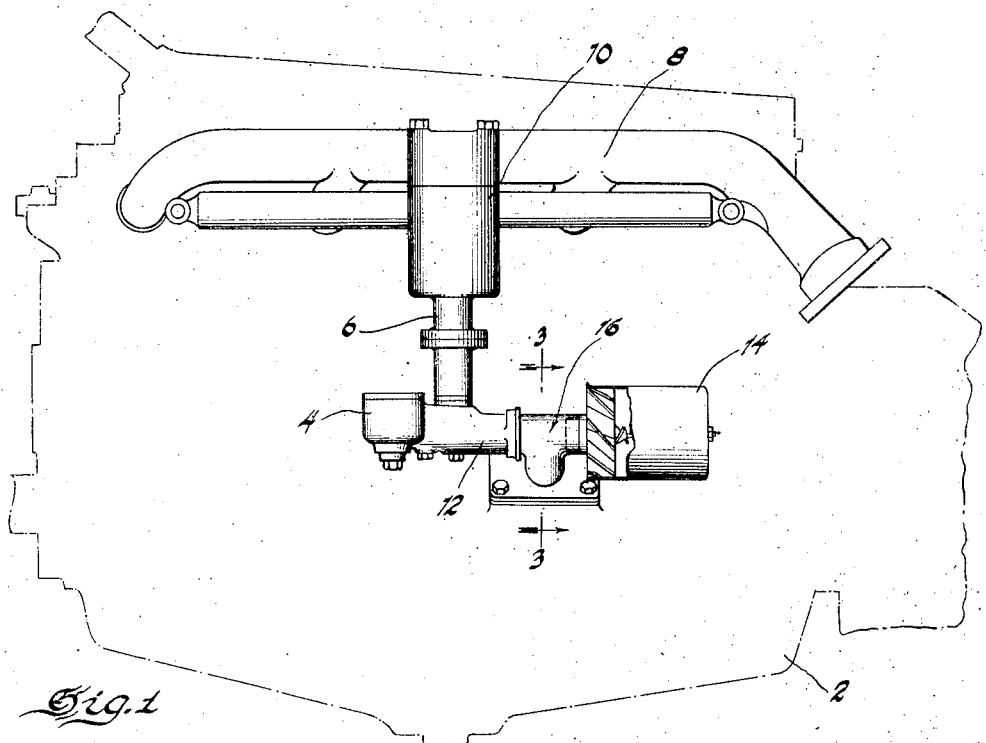
Fig. 1
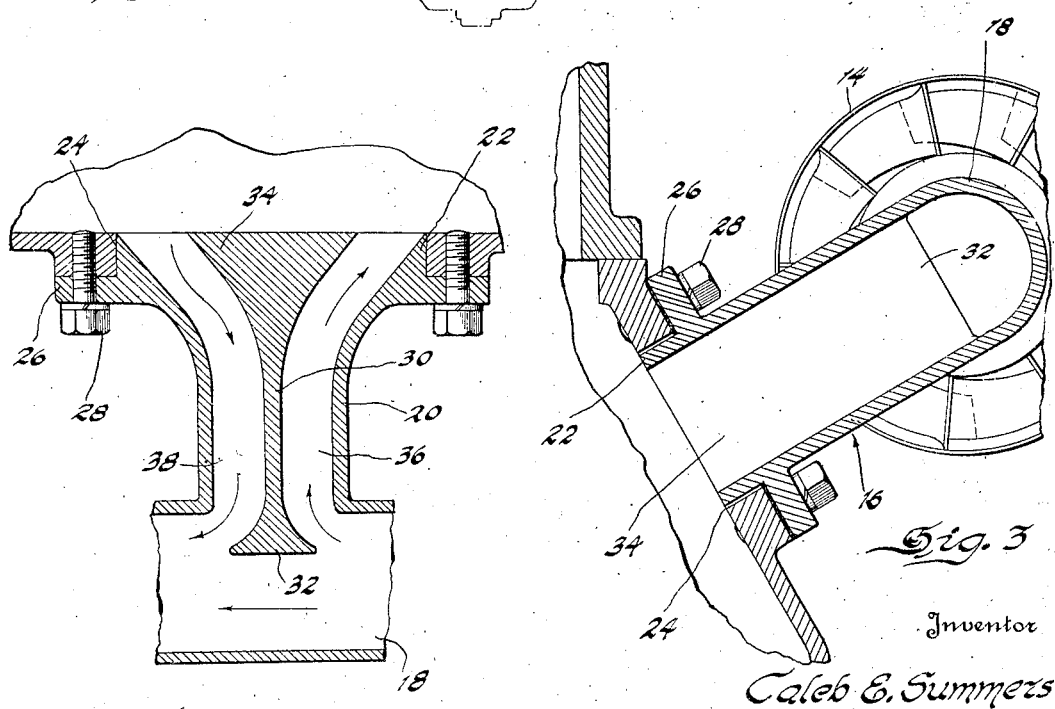
Fig. 2
Fig. 3
Inventor
Caleb E. Summers
By Blackmore, Spencer & Fluid.
Attorneys Patented Sept. 4, 1928.

1,682,992

UNITED STATES PATENT OFFICE.

CALEB E. SUMMERS, OF DETROIT, MICHIGAN, ASSIGNOR TO GENERAL MOTORS RESEARCH CORPORATION, OF DETROIT, MICHIGAN, A CORPORATION OF DELAWARE.

VENTILATING DEVICE FOR ENGINE CRANK CASES.

Application filed June 25, 1926. Serial No. 118,492.

This is an improvement on the construction shown and claimed in Patent No. 1,549,246, granted to James H. Davis on August 11, 1925. Both the patent and this application relate to means for passing a stream of air through an engine crankcase to effect removal of vapors, evaporation of diluents from the crankcase oil and incidentally a slight cooling of the engine. In that patent pipes extend from the crankcase into a conduit leading air to the carburetor, one pipe facing the air stream and diverting air into the crankcase and the other pipe facing oppositely and being subject to the aspirating action of the air flowing through the conduit so that air is drawn from the crankcase through it into the conduit. The air intake conduit is preferably provided with an air cleaner so that none but clean air can enter the crankcase or the carburetor.

My improvement consists in substituting for the pipes of the Davis construction a simple fitting having a wall extending into the air intake conduit to divert air into the crankcase. Preferably this fitting is in the form of a tubular member and the wall which projects into the crankcase divides the tubular member into two passages, one of which diverts air into the crankcase and the other of which is subject to the aspirating action of the passing air stream so that crankcase vapors are drawn through it into the intake passage. Preferably, also, the partition is flared outwardly at one or both ends, the flare at the outer end serving to increase the diversion of air into the crankcase and also the aspirating action, and the flare at the other end serving to distribute the air entering the crankcase and promote thorough ventilation.

On the drawing:

Figure 1 is a side view of a conventional automobile engine showing my device applied thereto.

Figure 2 is a sectional view through the ventilating fitting taken substantially on line 2—2 of Figure 3.

Figure 3 is a section on line 3—3 of Figure 1.

I have illustrated at 2 an engine of the conventional type employed upon automobiles, this engine having the usual carburetor 4, intake manifold 6, exhaust manifold 8, and in the form illustrated, a heater 10 for conducting exhaust gases about the intake conduit to heat the mixture. Carburetor 4 is supplied with air through conduit 12 to the outer end of which is fitted air cleaner 14, here illustrated as of the centrifugal type. Between the air cleaner and the carburetor I have provided a special fitting 16. The outer portion of this fitting is of tubular form as indicated at 18 and forms part of the air intake conduit 12 of the carburetor. Extending at an angle to the part 18 is a conduit or passage 20 having its inner end 22 fitting in aperture 24 provided in the engine crankcase. A flange 26 extends outwardly from the inner portion of the part 20 and is secured to the crankcase by suitable fastening means indicated at 28. The conduit or passage 20 is provided with partition 30, the forward end of which 32 tends within the conduit 18. This portion is preferably of outwardly flared form and the inner portion 34 of the conduit is similarly flared thereby forming passages 36 and 38 which diverge at both their inner and their outer ends.

In the operation of the device air which has been cleaned by passage through the air cleaner 14 travels through the air intake conduit to the carburetor in response to engine suction. A portion of this air is diverted by the projecting partition 32 through passage 36 into the crankcase. The air stream in the conduit likewise exerts an aspirating action on the passage 38 drawing air and fumes from the crankcase. The resultant mixture is led to the carburetor and thence to the intake manifold and cylinders. It will be noted that the arrangement of the inner ends of passages 36 and 38 at a diverging angle insures circulation of air throughout the crankcase.

With this apparatus a clean supply of air is provided for both carburetor and crankcase with the use of but a single air cleaner. The fitting 16 is of the utmost simplicity and serves to effectively divert air into the crankcase, distribute it throughout the latter, and lead the air and crankcase vapors back into the stream going to the carburetor.

I claim:

1. The combination of an engine having a crankcase, a passage leading from the crankcase, a conduit for conducting a stream of air across the passage, and a partition in the passage projecting into the conduit for diverting a portion of the air stream passing through the latter into the passage on one side of the partition, the air stream passing through the conduit exerting an aspirating effect on the portion of the passage at the other side of the partition for withdrawing vapors from the crankcase.

2. In the combination as set forth in claim 1, said engine being provided with the customary carburetor, and said conduit being connected to the carburetor for conducting air and vapors thereto.

3. In the combination as defined in claim 1, said engine being provided with the customary carburetor, said conduit being connected to the carburetor for conducting air thereto, the conduit being provided with an air cleaner so that clean air is supplied both to the carburetor and to the crankcase.

4. In the combination as defined in claim 1, said partition having its ends outwardly flared.

5. In the combination as defined in claim 1, said partition having the portion which projects into the conduit of outwardly flared form.

6. An engine having a crankcase, a passage communicating with the crankcase, a partition in the passage projecting beyond the end thereof, and means for directing a stream of air across the end of the passage, the said partition serving to divert a portion of said air stream into the conduit on one side of the partition, and said main air stream exerting an aspirating effect on the other side of the partition for withdrawing vapors from the crankcase.

7. In a ventilating device, a fitting comprising a tubular portion, a second tubular portion extending at an angle to the first tubular portion and communicating with the latter, and a partition in said second named tubular portion extending into the first named tubular portion transversely to the direction of flow therethrough.

8. In a ventilating device, a fitting in the form of a conduit provided with a partition projecting beyond the end thereof for diverting passing air currents into the conduit on one side of the partition and causing said currents to produce an aspirating effect on the other side of the partition.

In testimony whereof I affix my signature.

CALEB E. SUMMERS.